United States Patent
Kriening

(10) Patent No.: US 12,550,614 B2
(45) Date of Patent: Feb. 10, 2026

(54) DEVICE FOR CONVERTING THERMAL ENERGY INTO ELECTRIC POWER

(71) Applicant: Enrico Kriening, Herzberg/Elster (DE)

(72) Inventor: Enrico Kriening, Herzberg/Elster (DE)

( * ) Notice: Subject to any disclaimer, the term of this patent is extended or adjusted under 35 U.S.C. 154(b) by 0 days.

(21) Appl. No.: 18/889,599

(22) Filed: Sep. 19, 2024

(65) Prior Publication Data

US 2025/0107445 A1    Mar. 27, 2025

(30) Foreign Application Priority Data

Sep. 21, 2023  (DE) ..................... 10 2023 125 637.8

(51) Int. Cl.
*H10N 10/17*     (2023.01)
*H10N 10/10*     (2023.01)

(52) U.S. Cl.
CPC ............. *H10N 10/17* (2023.02); *H10N 10/10* (2023.02)

(58) Field of Classification Search
CPC ............................... H10N 10/10; H10N 10/17
See application file for complete search history.

(56) References Cited

FOREIGN PATENT DOCUMENTS

| | | |
|---|---|---|
| CN | 101728987 A | 6/2010 |
| CN | 116032156 A | 4/2023 |
| DE | 202009005735 U1 | 12/2010 |
| JP | 2002171776 A | 6/2002 |
| JP | 2012222169 A | 11/2012 |
| KR | 1020180043574 | 11/2018 |

OTHER PUBLICATIONS

English machine translation of KR20180043574A. (Year: 2018).*

* cited by examiner

*Primary Examiner* — Lindsey A Buck
(74) *Attorney, Agent, or Firm* — Smartpat PLC

(57) ABSTRACT

A device converts a temperature difference into electric power by a Peltier element. The device includes at least one cold chamber closed by walls and at least one heat chamber open to the outside towards a heating-up area. The heat and cold chambers adjoin one another by one of these walls. This wall includes a Peltier element. A bell surrounds all cold chambers and heat chambers and separates the heating-up area from the external environment. At least three of the cold chambers each have the shape of a three-sided isosceles prism and touch each other at an axis of symmetry. The cold chambers are symmetrically distributed over 360°. At least three of the open heat chambers extend between the cold chambers. These cold and heat chambers form a first floor of the device. The walls have cooling fins on both sides of the walls.

13 Claims, 4 Drawing Sheets

DEVICE FOR CONVERTING THERMAL ENERGY INTO ELECTRIC POWER

CROSS-REFERENCE TO RELATED APPLICATION

This application claims the benefit of German Patent Application DE 10 2023 125 637.8 filed on Sep. 21, 2023, the content of which is incorporated in its entirety.

BACKGROUND

The disclosure relates to the conversion of thermal energy into electric power, whereby a temperature difference is converted into electric power by a Peltier element.

Peltier elements are known. They are electrothermal converters which, based on the Peltier effect, generate a temperature difference when a current flows through them or (conversely and relevant to the invention) a current flow (Seebeck effect) is generated when a temperature difference is present.

Peltier elements are used in camping coolers, for example.

SUMMARY

The task of the present disclosure is to provide a device for generating electricity that works after a short heating phase. It should generate as little effort as possible during operation. It should also offer the possibility of mobile use.

The task is achieved with the features of the independent claims. Preferred embodiments are illustrated by the dependent subclaims.

The device for converting thermal energy into electric power, includes at least one cold chamber closed by walls, and at least one heat chamber open to the outside towards a heating-up area. The heat chamber and the cold chamber adjoin one another by means of one of these walls, so that this wall of the cold chamber also forms a wall of the heat chamber.

This wall comprises a Peltier element, and pipes for a liquid or gaseous cooling medium with an inlet into the cold chambers, and a (preferably removable) bell. The bell surrounds all cold chambers and heat chambers and separates the (one common) heating-up area of the device from the external environment.

A wall comprising a Peltier element delimits both a cold chamber and a heat chamber from one another. It is therefore both a wall of the cold chamber and a wall of the heat chamber. This also refers to those walls that separate the cold chamber from the heating-up area (because the heat chambers are open to the heating-up area according to the invention).

It makes sense for the number of cold and heat chambers in the device according to the invention to be the same, particularly preferably those are each 3 or even 5 or twice as many, i.e. 6 or 10, respectively. They are therefore always pairs of cold and heat chambers, with the different walls separating different cold and heat chambers from one another.

The Peltier element is usually made of aluminum oxide ceramic.

Regarding cooling: Each closed cold chamber has at least one inlet for the cooling medium to be cooled.

It also makes sense to have an outlet from the cold chamber for the cooling medium (at least in the case of a liquid cooling medium that does not evaporate). Gaseous cooling media or liquid cooling media that evaporate completely, such as for example liquid nitrogen, can escape from the cold chamber through cracks and do not require a outlet. Possible cooling media include, for example: water, cooling spray, gaseous refrigerants such as those used in refrigerators, organic cooling media such as ethylene glycol and others.

Preferably, each wall of the closed cold chambers is adjacent to a heat chamber or at least to the heating-up area (with the recognizable exception of the walls that extend to the floor). However, it is also possible to position the device on spacers or stilts so that the heating-up area is also formed underneath, which is shielded from the external environment by the bell.

The "bell" within the meaning of the disclosure can be black or transparent, for example. It is usefully removable, which offers advantages during maintenance, but can also be firmly connected to the base or a base plate above which the cold chambers and heat chambers are arranged.

In any case, it has a certain thermal insulating power, so that the heating-up area reaches a temperature that is sensibly above room temperature. In any case, in the meaning of the invention, the temperature in the heating-up area (and thus also in the heat chambers open to the heating-up area) must be greater than in the cold chambers, in particular by at least 20K. Due to this temperature difference between the cold and heat chambers, electricity is generated at the wall (or the walls), which delimit both a heat chamber and a cold chamber, by means of the Peltier element of the wall. It is also recognizable that current is generated on such walls that delimit a cold chamber from the heating-up area (as is the case, for example, with the wall surfaces pointing to the side and outwards as shown in embodiment example 1/FIG. 2).

The object of the disclosure is also a set for converting thermal energy into electric power, comprising the device according to the invention, with a battery connected to the Peltier elements and/or with a lens for directing sunlight onto the device. In a preferred embodiment mentioned below with electric heater, the battery would usefully also be connected to this electric heater.

A method for converting thermal energy into electric power, includes the steps:
a) Heating the heating-up area of the device according to the invention up to a temperature difference between cold chambers and heat chambers of at least 20K (the heat chambers have the higher temperature and the cold chambers the lower temperature), for initial charging of a battery connected to the device, and
b) Continuous cooling of the closed cold chambers by means of a liquid or gaseous cooling medium.

Embodiments for the process also relate to the set with battery or an embodiment of the device with battery.

Finally, the object is also the use of the device (or set) according to the invention for integration into a living room wall of a building, wherein the cooling medium for the cold chambers is guided past the building floor slab for cooling. This is because experience has shown that the building floor slab has lower temperatures than the ambient air and can therefore serve to cool the cooling medium so that it can be channeled from there into the cold chambers of the device according to the invention. In particular, the object is also the use in the method according to the invention.

Finally, embodiments for the device for converting also relate to the objects set, method or use.

Advantageously, the device allows mobile power generation with continuous cooling, e.g. by means of a mobile cooling spray.

The device can use the sun to start heating up the heating-up area and the heat chambers, open to it, in order to charge a battery, for example, and then enable operation for a long time even without the sun—all that is required is continuous or intermittent cooling of the cold chambers. The effort required to maintain continuous and long-term operation is therefore low.

The design, in which the closed cold chamber with a common wall adjoins a heat chamber, with insulation by the bell, makes it possible to ensure continued operation even in the dark, e.g. overnight. If the sun is still not available afterwards, it is possible to achieve heating-up also by means of an electric heater within the heating-up area, as described in a preferred embodiment further back in the document.

This "common wall" construction according to the invention also allows a multi-floor design.

DETAILED DESCRIPTION

In a preferred embodiment, the pipe for the cooling medium runs from a refrigerator or freezer into the cold chambers. In this case the device preferably also comprises a battery (direct current) and a 220 V inverter for operating a standard household alternating current refrigerator, whereby this battery is connected to the Peltier elements of the device so that the battery is charged.

It is preferable in the process if the heat chambers (after heating-up in step a) reach a temperature of 50° C.±5° C. and the temperature in the cold chambers is therefore 30° C.±5° C. This temperature range has proven to be optimal for a good balance between energy input (sun or electricity) and energy output (cooling and energy generation).

During the process in step b), the cooling medium is preferably introduced into the respective cold chambers from above. This has the advantage that the cooling effect is more uniform along the vertical walls and the upper wall.

Preferably, there is a heat sensor in the heating-up area of the device according to the invention and a cold sensor in each of the cold chambers. Advantageously, the target temperature difference of at least 20K can thus be monitored.

In a preferred embodiment of the invention, the device comprises:

at least three of the cold chambers, each of which has the shape of a three-sided isosceles prism, and
they touch each other at their respective edge between the same legs and form an axis of symmetry there, and
whereby they are distributed symmetrically over the 360° around the axis of symmetry and form intermediate spaces (i.e. with 3 cold chambers, they are each offset by 120°; with 5 cold chambers, they would be offset by 360°/5 etc.), and
at least three of the open heat chambers, which extend in these intermediate spaces, whereby these open heat chambers are also three-sided isosceles prisms (i.e. they have this shape; whereby, since the heat chambers are open, out of the three lateral surfaces only the two isosceles surfaces are present—with reference to the lower representation of an isosceles prism, on the surface c*h the wall is missing, so to speak),
so that these cold chambers and heat chambers form a first floor of the device, and
whereby the walls (of the cold chambers) on all three sides of the isosceles triangles (these are the areas a*h, b*h and c*h in the lower representation of this prism shape) comprise Peltier elements and have cooling fins on both sides of the walls (wall sides).

As the open heat chambers extend in the intermediate spaces, the heat chambers are also distributed symmetrically over the 360°, so that within this first floor always a cold chamber and a heat chamber alternate). "First floor" is the first floor counted from below, i.e. as seen from the base or a base plate.

The heat chambers therefore only have "walls of the cold chambers".

Figure 5:
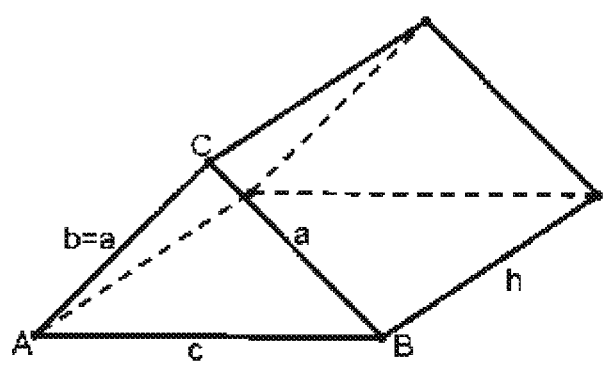
FIG. 5 shows a three-sided isosceles prism.

A three-sided isosceles prism has the geometric shape shown in FIG. 5:

The axis of symmetry referred to here is the axis between point C of one base surface (ABC) and the point on the opposite base surface.

Figure 4:
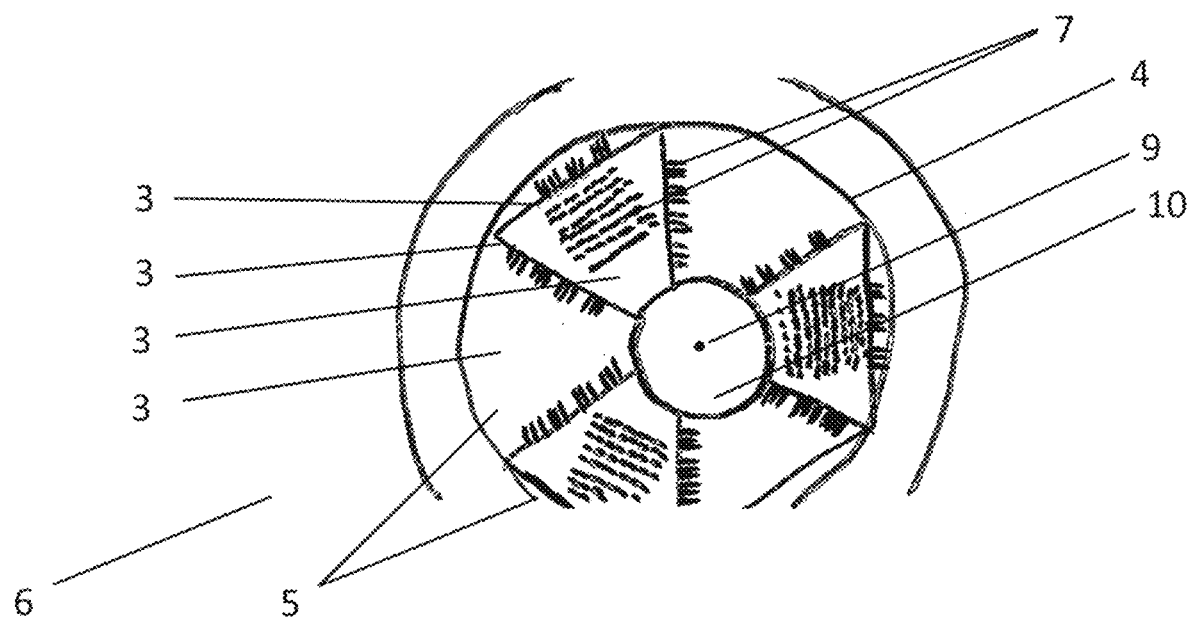
FIG. 4 shows the top view onto this two-floor embodiment with labelling of the bell, which delimits the heating-up area (inside the device according to the invention) from the external environment and thermally insulates it. It can be recognized the upper floor with its (vertically extending) walls and the (horizontal) upper wall surfaces of the cold chambers of the lower floor (which also have cooling fins, but these are not shown. It should be noted that there is a common heating-up area of the device, i.e. the prisms recognizable in FIG. 4 are not adjacent to the bell 4, but leave a gap, so that a common heating-up area is formed within the bell.

Preferably, all cold chambers have the same shape, and consequently also the heat chambers have the same shape. With regard to the walls, this means (in an embodiment with exactly three cold chambers on one floor, as in FIG. 4) that there are nine (vertical) walls on this floor, six of which directly connect the cold chambers and heat chambers and three of which separate the cold chambers from the heating-up area. According to the invention, each of these walls comprises the Peltier element.

Easily recognizable, in this (symmetrically distributed) arrangement along an axis of symmetry, the number of cold chambers and the number of heat chambers in the floor are the same.

"Cooling fins" are a means of improving the transfer of thermal energy from or to the Peltier elements of the walls. The cooling fins therefore project away from a cold chamber into the heating-up area on one side and into the cold chamber on the other side.

Particularly preferably, all walls of the cold chambers comprise Peltier elements with cooling fins on both sides of the wall (the bottom wall can be excluded if a cold chamber is located directly on the floor without spacers).

In a particularly preferred variant of this embodiment with at least three cold chambers and at least three heat chambers, the side walls forming the isosceles prism are glued together; in particular, all walls of the device according to the invention can be glued together.

In a preferred embodiment of the invention, the walls have such cooling fins (on both sides of the wall) over at least 75% of their respective surface area. In any case, the cooling fins cover at least the same area of the wall as it is formed by the Peltier element.

In a preferred variant of the embodiment with at least three cold chambers and at least three heat chambers in a first floor, at least one further floor is comprised in the same structure as the first floor and this further floor is located above the first floor, wherein the first and each further (upwardly following) floor are offset from one another around the axis of symmetry in such a way that each cold chamber is limited from above by a heat chamber and vice versa.

In other words, also this further floor (more than two floors are also possible) comprises the at least three cold chambers and the at least three heat chambers, etc. It makes sense that the triangular top and bottom sides of all the cold chambers of the further floor (located above) also form walls according to the invention with a Peltier element.

Each floor is offset by 360°/(2×) from the neighboring floor, where x is the number of cold chambers on the floor. This means that with 3 cold chambers per floor, there are 3 cold and 3 heat chambers on one floor, i.e. a total of six chambers. The neighboring floor is offset by 360°/6 (or more precisely: rotated around the axis of symmetry), i.e. by 60°. This means that there is a heat chamber above a cold chamber and vice versa.

The advantage of this multi-floor design is better efficiency and longer operation even without solar radiation or electrical heating-up.

The lowest floor (first floor) is usefully delimited by a base plate on which the bell according to the invention can be placed. However, as already mentioned above, it is also possible to position the device on spacers or stilts, so that a heating-up area is also formed below, which is shielded from the external environment by the bell.

In another preferred embodiment, that wall is formed with 70% (preferably 75-85%) of the wall surface by the Peltier element; in particular, this is the case for all walls. The remainder of the wall surface can be covered with aluminum foil for better insulation. This is because the heat transfer through the wall should only take place at the areas of the Peltier element.

In an equally preferred variant of the above-mentioned embodiment of the invention with an axis of symmetry, a riser pipe is provided in the region of this axis of symmetry, in which the pipes for the liquid or gaseous cooling medium are arranged.

They guide from floor to floor there (if there are several floors); in any case, the pipes can easily be guided from there into all cold chambers, as each cold chamber (in this embodiment) touches each other at its respective edge between the same legs (of the isosceles prism).

The "riser pipe" is a tube in the center of which the axis of symmetry is located and to which each cold chamber adjoins. Advantageously, this arrangement is best suited to save space when stowing the pipes for the cooling medium and electrical cables that need to be routed to the cold chambers (or, more correctly, to the Peltier elements).

In a preferred embodiment of the invention, cooling fins are arranged on both sides of the walls. These are preferably made of a material selected from aluminum and copper.

In a preferred variant of the embodiment with at least three cold chambers and at least three heat chambers, in at least one heat chamber of the first (lowest) floor an electric heater extends between the heating-up area and the heat chamber; preferably in each heat chamber of the first floor.

A rolled heating foil is particularly preferred.

The advantage is that this electric heater can be used both for initial heating (with the bell closed) and for later heating of the heating-up area, so that the device can also be used in the dark. Sunlight is no longer required.

In a further preferred embodiment of the invention, the bell is made of glass or PVC and at least 35% of its surface is covered with a reflective foil (in particular 35-50%). The advantage of this transparent embodiment is that sunlight can pass through and is reflected by the reflective foil inside the bell. This is suitable for heating up the heating-up area of the device according to the invention in the sun.

The foil is arranged in such a way that sunlight falling on the bell from diagonally above is reflected from the inner surface of the bell behind the cold chambers and the heat chambers, so that more heat energy from the sun is available inside the bell in the heating-up area.

It is also preferable if the Peltier element is square and has a size of 4 cm×4 cm to 8 cm×8 cm.

In a preferred variant of the embodiment with at least three cold chambers and at least three heat chambers, the device has exactly three heat chambers and three cold chambers per floor. Advantageously, here one cold chamber has warm outer surfaces (except for the cold chamber on the lowest floor). This variant is particularly suitable for saving space while maintaining good efficiency and a simple design. Here, the design is also not too small to be manufactured by hand.

In a preferred embodiment of the process according to the invention, heating-up in step a) is carried out by means of
  Irradiation of solar radiation onto the device, and/or
  Heating up the heating-up area using an electric heater.
    Both are also possible.

The electric heater is at best a rolled heating foil, as already described above.

The advantage is that the initial heating-up of the device (with the bell closed) does not have to take place by sunlight, but can also take place via the electric heater.

The device in this embodiment therefore also works without sunlight.

In the following, the invention will be explained in more detail with reference to a preferred embodiment. It is not intended to limit the invention.

Execution Example 1

The embodiment according to execution example 1 shown in the figures is a two-floor device. With the exception of FIG. 4, the bell 4 is not shown and serves to be placed over the cold and heat chambers (1, 2) so that the heating-up area 5 is separated and insulated from the external environment 6 of the device.

Each floor has three cold chambers 1 and three heat chambers 2. All six are distributed symmetrically around an axis of symmetry 9. In the area of the axis of symmetry 9 there is a riser pipe 10, in which the pipes 8 for the cooling medium and also, sensibly, the electrical cables leading to the Peltier elements are stowed. The symmetrical arrangement of the cold and heat chambers of the one floor is offset by exactly 360°/6 on the other floor, i.e. by 60° around the axis of symmetry. Each of the existing walls (of all cold chambers and heat chambers) has a Peltier element, whereby cooling fins 7 in an area of the Peltier element are attached both inside and outside (i.e. on both sides of the wall)—with the exception of the lowest wall of the lowest floor, which is in contact with the base plate.

Figure 1:
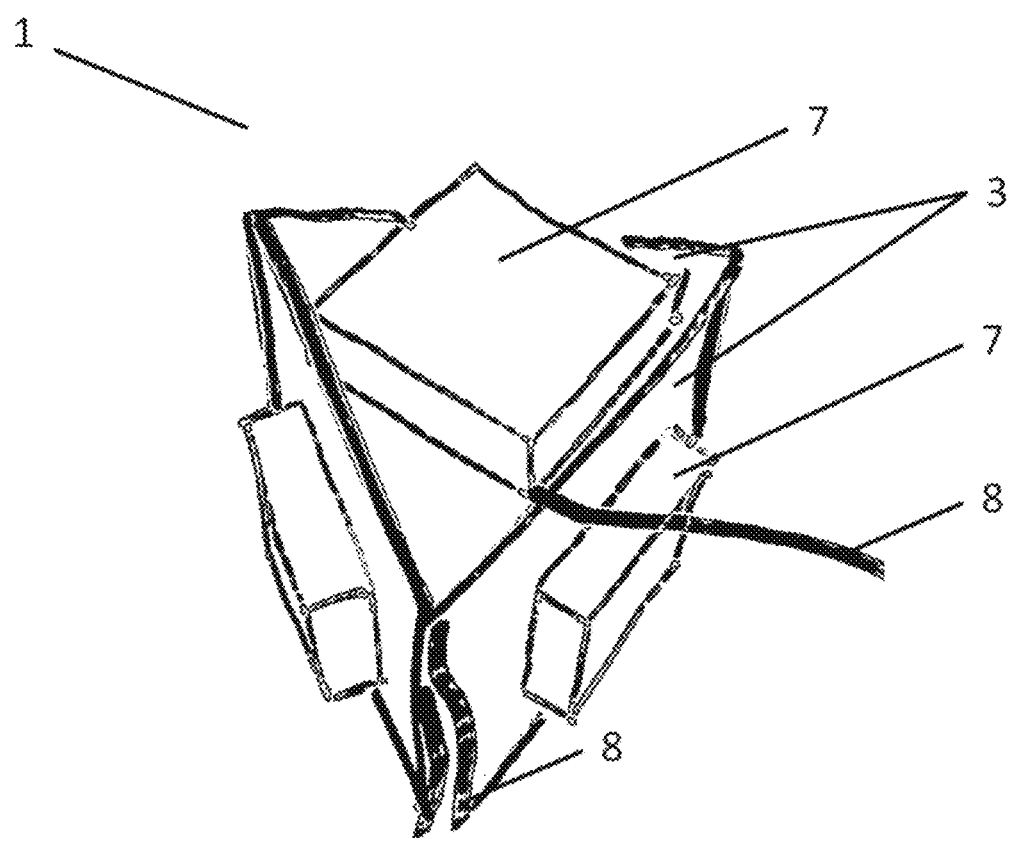
FIG. 1 shows an excerpt of a cold chamber of a preferred embodiment of execution example 1. Each of the walls shown can form a wall of an adjacent heat chamber.
Figure 2:
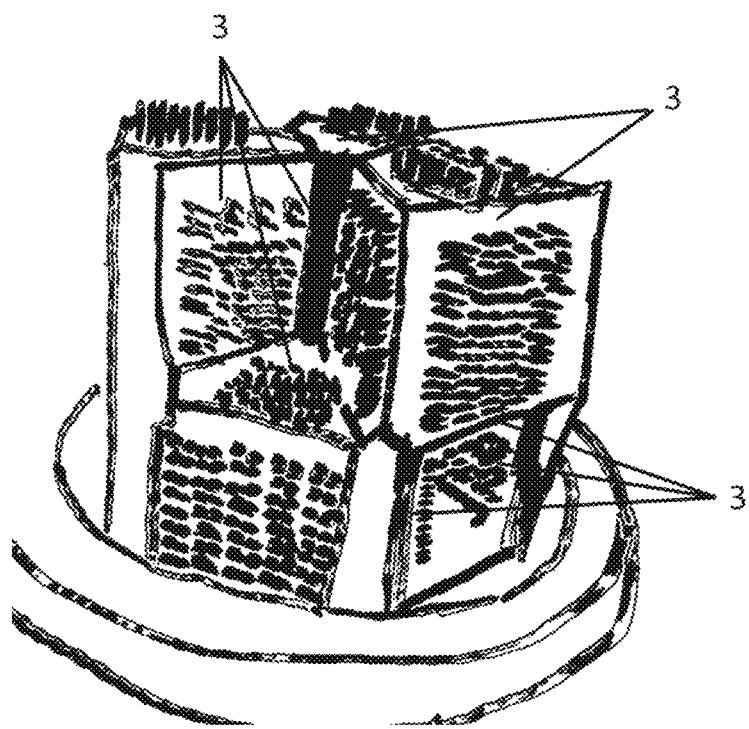
FIG. 2 shows the two-floor embodiment of the device according to execution example 1 (the bell is not shown).
Figure 3:
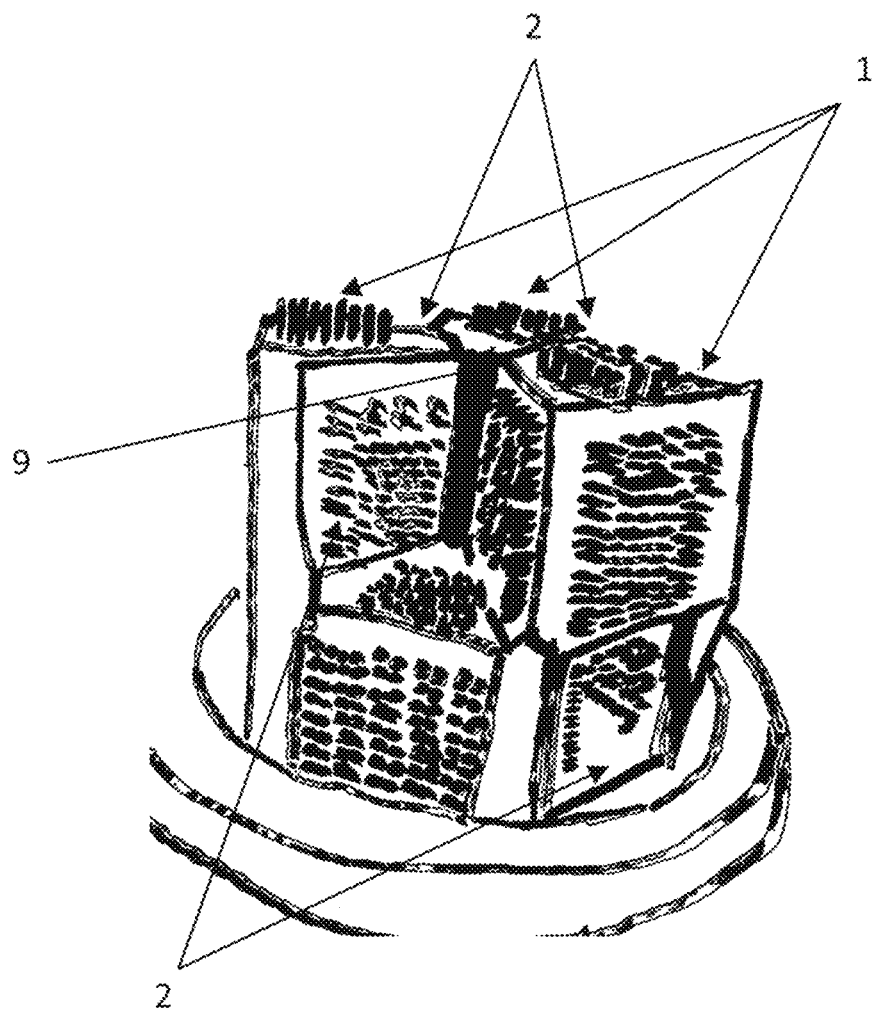
FIG. 3 characterizes the cold chambers and the heat chambers as well as the central axis of symmetry in the same illustration.

In excerpts, the cold chambers are shown in FIG. 1. There, the Peltier elements are located below the cooling fins 7.

REFERENCE SIGNS

1 Cold chambers (closed)
2 Heat chambers (open to the heating-up area)
3 Walls, comprising Peltier element
4 Bell
5 Heating-up area
6 External environment (outside the cooling and heat chambers enclosed by the bell housing)
7 Cooling fins
8 Pipes (for cooling medium with inlet into the cold chambers)
9 Axis of symmetry
10 Riser pipe (for pipes for cooling medium)

What is claimed is:

1. A device for converting thermal energy into electric power, comprising:
   at least three cold chambers (1) closed by walls (3), each being shaped as a three-sided isosceles prism, arranged to touch each other at a respective edge between same legs of an isosceles triangle of the isosceles prism there forming an axis of symmetry (9),
     the at least three cold chambers (1) being symmetrically distributed over 360° of the axis of symmetry and forming intermediate spaces;
   at least three heat chambers (2), each open to an outside towards a heating-up area (5) and each being shaped as a three-sided isosceles prism;
   pipes (8) for a liquid or gaseous cooling medium with an inlet into the at least three cold chambers (1); and
   a bell (4), which surrounds the at least three cold chambers (1) and the at least three heat chambers (2) and separates the heating-up area (5) from an external environment (6),
   wherein the at least three heat chambers (2) and the at least three cold chambers (1) adjoin one another by walls (3),
   wherein each of the walls forms a wall of one of the at least three cold chambers and also forms a wall of one of the at least three heat chambers, and
   wherein each of the walls comprises a Peltier element,
   wherein the at least three heat chambers (2) extend into the intermediate spaces,
   wherein the at least three cold chambers (1) and the at least three heat chambers (2) form a first floor of the device, and
   wherein the walls have cooling fins (7) on both sides.

2. The device according to claim 1, further comprising one or more further floors, the one or more further floors having a same structure as the first floor and being located above the first floor, wherein the first floor and each further floor are offset relative to one another around the axis of symmetry (9) in such a way that each cold chamber (1) is limited from above by a heat chamber (2) and vice versa.

3. The device according to claim 1, wherein 70% of a surface of each of the walls (3) is formed by a respective one of the Peltier elements.

4. The device according to claim 1, further comprising a riser pipe (10), wherein the pipes (8) for the liquid or gaseous cooling medium are arranged in the riser pipe (10).

5. The device according to claim 1, wherein the cooling fins (7) are made of a material selected from aluminum and copper.

6. The device according to claim 5, wherein at least in each heat chamber (2) of a lowest floor an electric heater extends between the heating-up area (5) and the heat chamber.

7. The device according to claim 1, wherein the bell (4) is made of glass or PVC and at least 35% of its surface is covered with a reflective film.

8. The device according to claim 1, wherein each Peltier element is square in a size 4 cm×4 cm or 8 cm×8 cm.

9. The device according to claim 1, comprising a plurality of floors with three of the at least three heat chambers (2) and three of the at least three cold chambers (1) per floor.

10. The device according to claim 1, further comprising a heat sensor in the heating-up area and a cold sensor in each of the at least three cold chambers.

11. A set for converting thermal energy into electric power, comprising:
    the device according to claim 1; and
    a battery connected to the Peltier elements and/or
    a lens for directing sunlight onto the device.

12. A process for converting thermal energy into electric power, comprising:
    providing the device according to claim 1;
    heating-up the heating-up area (5) to a temperature difference between the at least three cold chambers (1) and the at least three heat chambers (2) of at least 20K, for initial charging of a battery connected to the device; and
    continuously cooling the at least three cold chambers by a liquid or gaseous cooling medium.

13. The process according to claim 12, wherein the heating-up is carried out by
    irradiation of solar radiation onto the device, or
    an electric heater.

* * * * *